US006859358B2

(12) United States Patent
Baldwin et al.

(10) Patent No.: US 6,859,358 B2
(45) Date of Patent: Feb. 22, 2005

(54) SUB-NOTEBOOK PORTABLE COMPUTER WITH INTEGRATED WIRELESS MOBILE TELEPHONE

(75) Inventors: Travis Baldwin, Raleigh, NC (US); Susan Sommers Moffatt, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/952,453

(22) Filed: Sep. 14, 2001

(65) Prior Publication Data

US 2003/0053287 A1 Mar. 20, 2003

(51) Int. Cl.[7] .................................................. G06F 1/16
(52) U.S. Cl. ........................ 361/683; 361/679; 348/552; D14/329
(58) Field of Search ................................. 361/679–686; 348/552; D14/329–330

(56) References Cited

U.S. PATENT DOCUMENTS

| 5,020,090 | A | * | 5/1991 | Morris | ..................... 455/556.1 |
| 5,907,815 | A | * | 5/1999 | Grimm et al. | .............. 455/557 |
| 6,049,450 | A | * | 4/2000 | Cho et al. | .................... 361/683 |

* cited by examiner

Primary Examiner—Yean-Hsi Chang
(74) Attorney, Agent, or Firm—J. Bruce Schelkopf; Dillon & Yudell LLP

(57) ABSTRACT

A sub-notebook computer is combined with an integrated wireless telephone. The overall size including the telephone is only two-thirds the size of a conventional notebook computer. This device seamlessly combines the function of a laptop computer with the function of a cellular phone. By integrating the telephone and the computer, the user can transfer wireless data much more easily. No cables or synchronization is required. The user has the benefit of using the larger display and keyboard of the computer instead of the miniature display and keyboard of the telephone. These features greatly expand the capability of the telephone in retrieving and accessing wireless data through the Internet.

12 Claims, 3 Drawing Sheets

SUB-NOTEBOOK PORTABLE COMPUTER WITH INTEGRATED WIRELESS MOBILE TELEPHONE

BACKGROUND OF THE INVENTION

1. Technical Field

The present invention relates in general to an improved portable computer, and in particular to an improved portable computer, such as a sub-notebook portable computer, with an integrated mobile telephone.

2. Description of the Prior Art

Currently, a significant number of hand-held computer devices, such as personal digital assistants, allow a user to communicate between her or his cellular or mobile telephone and computer. Using current technology, the user must carry the two separate devices and manually transfer data from one to the other. As more people access Internet and other data using their mobile telephones, they typically desire larger screens to make viewing of the information easier, and to be able to access the data faster. However, many users prefer the smaller hand-held devices and do not want to carry a full-sized notebook computer with them to facilitate their preferences.

Some manufacturers of such equipment have attempted to solve the problem of accessing data wirelessly from the Internet by expanding the functions of their cellular phones. They have added somewhat larger displays and some additional functions to allow the user to view and download more information. However, the user is still limited by the relatively small screen sizes and the diminutive telephone keypad and very limited number of keys on these types of telephones. Although it is possible to transfer data from cellular telephones to mobile and handheld computer devices for storage, faxing, etc., the user is required to carry with her or him both devices, which can be cumbersome and inconvenient. Thus, an improved device that is capable of incorporating the desirable features of both a highly portable computer apparatus and a mobile telephone while retaining their independent functions is needed.

SUMMARY OF THE INVENTION

One embodiment of a mobile computing device comprises a sub-notebook with integrated mobile telephone, such as a cellular telephone. The entire unit is very small and lightweight. The overall size including the phone is only two-thirds the size of a conventional notebook. This device seamlessly combines the function of a laptop computer with the function of a cellular phone. By integrating the telephone and the computer, the user can transfer wireless data much more easily. No cables or synchronization is required. The user has the benefit of using the larger display and keyboard of the computer instead of the miniature display and keyboard of the telephone. These features greatly expand the capability of the telephone in retrieving and accessing wireless data through the Internet.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT OF THE PRESENT INVENTION

Figure 1:
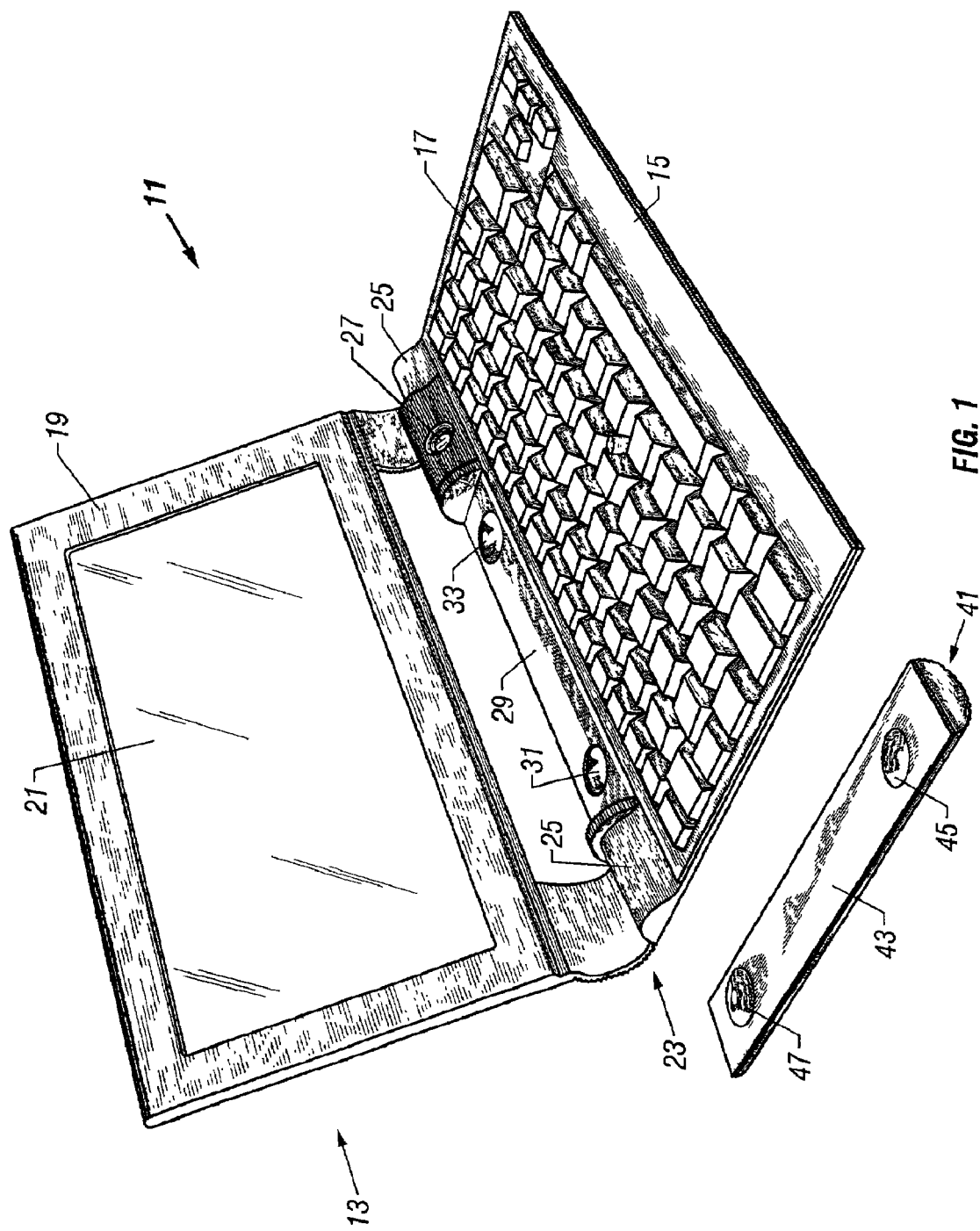
FIG. 1 is an isometric view of one embodiment of a sub-notebook computer constructed in accordance with the present invention and is shown with a cover in an open position and an integrated wireless telephone is a detached position.
Figure 2:
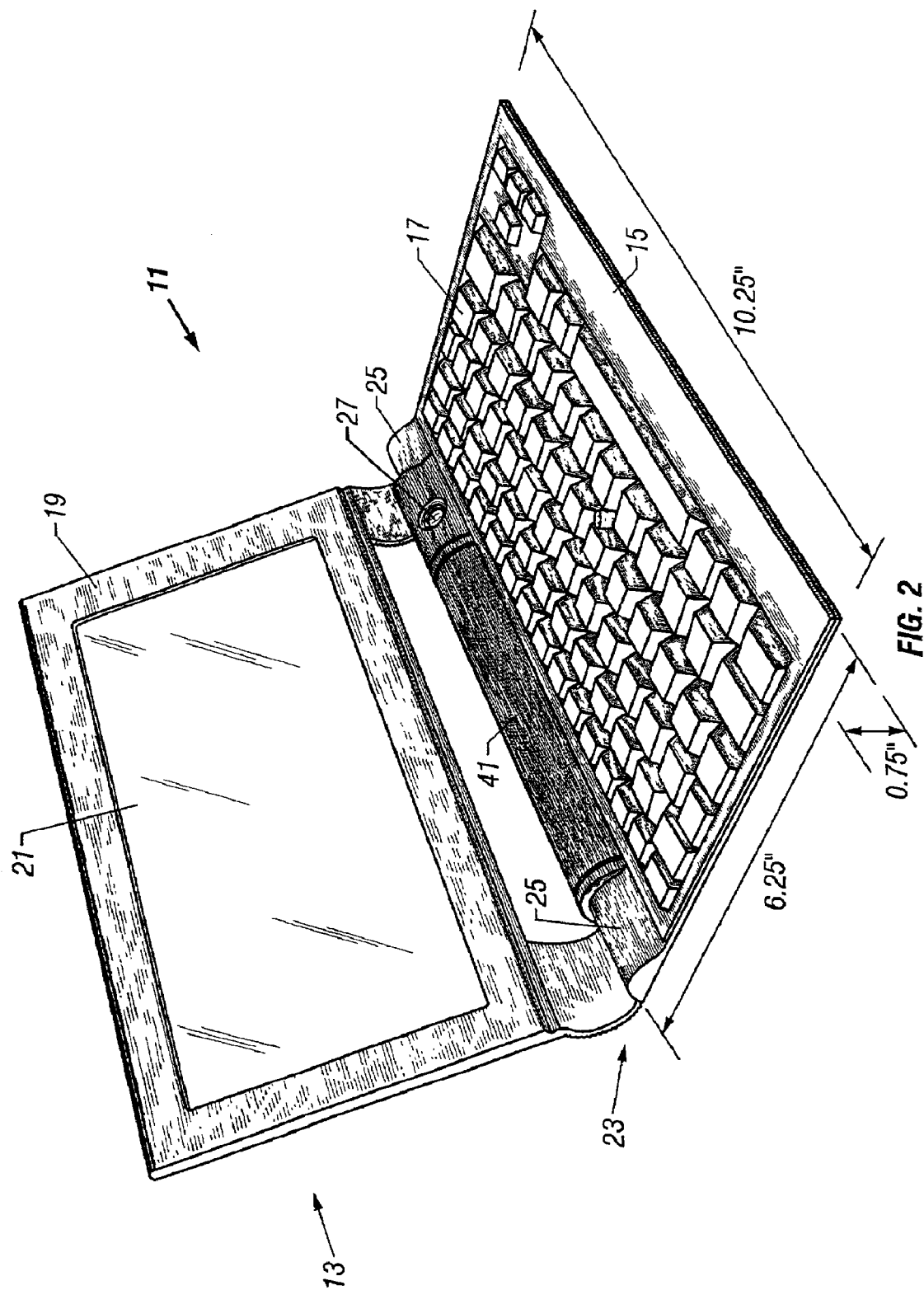
FIG. 2 is an isometric view of the sub-notebook computer of FIG. 1 with the cover in the open position and the telephone is an installed position.
Figure 3:
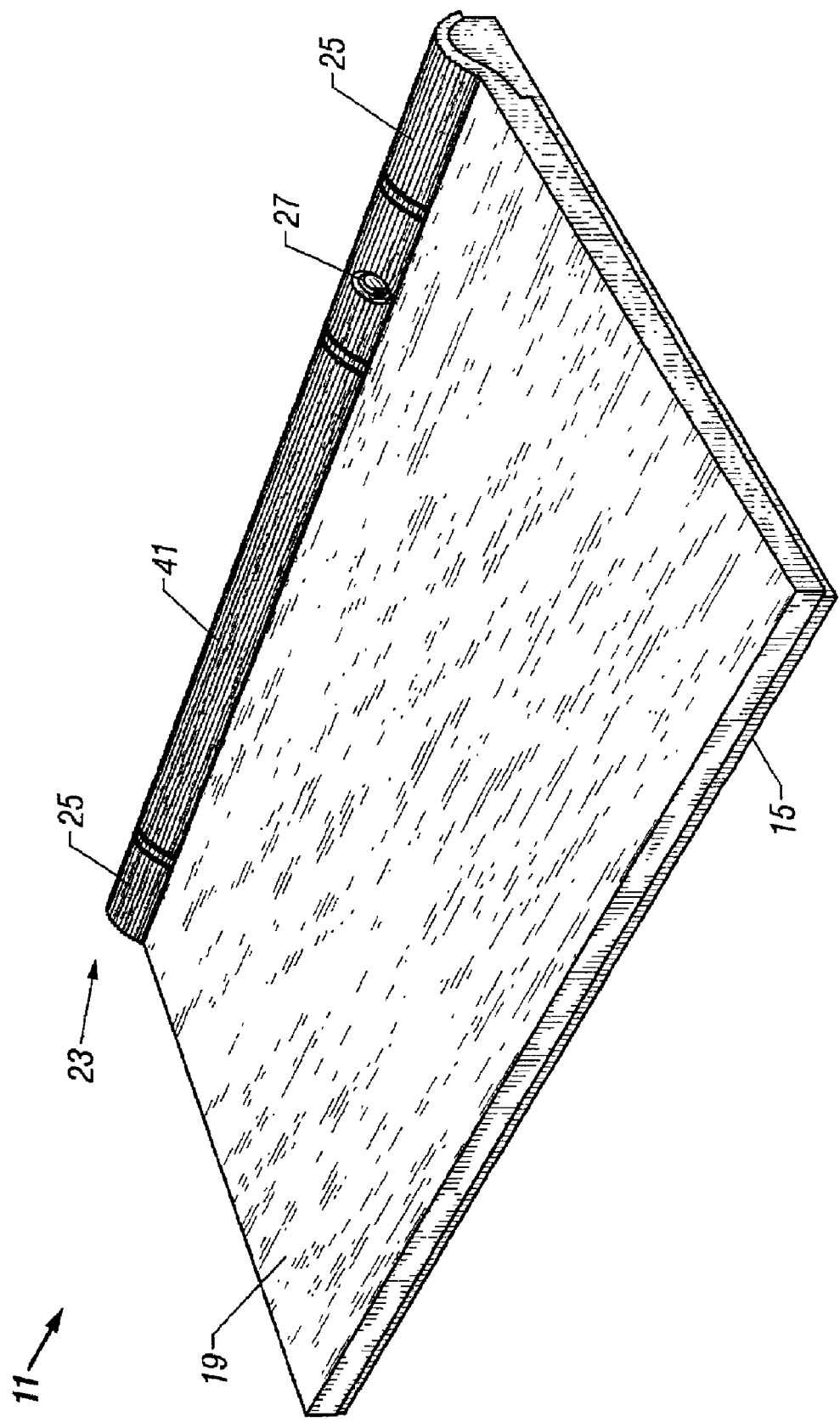
FIG. 3 is an isometric view of the sub-notebook computer of FIG. 1 with the cover in a closed position and the telephone is the installed position.

Referring to FIG. 1, one embodiment of a portable computing and communications device 11 having two major components is shown. In this version, the first component of device 11 comprises a sub-notebook computer 13. Sub-notebook 13 is approximately two-thirds the size of a conventional, prior art notebook or laptop computer. Sub-notebook computer 13 has a rectangular base 15 with a keyboard 17 having individual keys that substantially cover the entire upper surface of base 15. Computer 13 also has a rectangular cover 19 with a display monitor 21 pivotably mounted to base 15 for movement between an open position (FIGS. 1 and 2) and a closed position (FIG. 3).

A hinge region 23 is located between cover 19 and base 15. Hinge region 23 includes a pair of hinges 25 that are located adjacent to and extend between the lateral side edges of cover 19 and base 15. In this embodiment, a video camera 27 is also located in hinge region 23. Camera 27 is preferably a rotatable charge-coupled device camera having swivel still and motion capabilities. Hinge region 23 also comprises a small, flat, rectangular surface area 29 with keying features that, in the version shown, include a concave dimple 31 and a convex protrusion 33.

As shown in each of the figures, computer 13 has an overall form factor that defines its external appearance in both the open and closed positions. Computer 13 has a sleek rectangular profile with extremely thin edges along the perimeter of both base 15 and cover 19. Computer 13 includes a generally rounded or semi-cylindrical hinge region 23 between base 15 and cover 19. Even the casing of camera 27 is curved to maintain this profile.

The second major component of portable computing and communications device 11 is a mobile telephone 41, such as a cellular phone. Telephone 41 is generally semi-circular in shape with a flat rectangular surface area 43 having keying features that, in the version shown, include a concave dimple 45 and a convex protrusion 47. In addition, telephone 41 and/or computer 13 are/is equipped with a speaker phone feature for hands-free telephony in both the mounted and detached positions, which will be described below. Furthermore, computer 13 and telephone 41 have internal wireless communications circuitry for transmitting both voice and data.

Telephone 41 has a mounted position on an exterior of computer 13 in hinge region 23. In this position, telephone 41 axially aligns with hinges 25 and camera 27 to maintain the profile of hinge region 23 and the form factor of computer 13. Dimple 45 and protrusion on telephone 41 key alignment with protrusion 31 and dimple 33 on base 15. In the mounted position, telephone 41 and computer 13 can automatically communicate data therebetween. Telephone 41 also has a detached position wherein it is removed from computer 13 (FIG. 1). In this position, both telephone 41 and computer 13 are simultaneously and independently operable. In addition, regardless of the presence or absence of telephone 41, the form factor of computer 13 is maintained in both the mounted and detached positions. Moreover, the form factor is maintained regardless of whether computer 13 is in the open or closed position.

The present invention demonstrates a telephone that is an integral part of the computer. The telephone neatly snaps into the notebook chassis. The sub-notebook contains a state of the art processor, hard disk drive, and memory. In one embodiment, it also has a 10.4 inch TFT SVGA 800/600 display, a swivel still and motion video camera, faxing capability, and a microphone for voice recognition software. The computer includes a keyboard with a complete set of keys. The keys are preferably only 10% smaller than conventional full-sized keys. In addition, the unit comes complete with a uniquely designed carrying case that allows the user easy access to the telephone without requiring removal of the computer from the case.

The overall size of the unit, including both the sub-notebook and the phone, is only approximately 10.25 inches wide by 6.25 inches deep by less than one inch thick (see FIG. 2), or approximately two-thirds the size of a conventional notebook computer. The device simultaneously functions as an expanded cell phone and a full personal computer. The carrying case has a shoulder strap and additional compartments, making it easy for the user to carry only one device. Different versions of the case can be designed to target women as purses, students as backpacks, executives as computer bags, etc.

The mobile or cellular telephone in this unit can function as a stand-alone telephone without the use of the computer. The telephone has programmable buttons that can be preset to frequently called telephone numbers. By integrating the telephone and the computer, the user can transfer wireless data much more easily. No cables or synchronization is required. The user has the benefit of using the larger display and the keyboard of the computer instead of the miniature display and keyboard of the telephone. These features greatly expand the capability of the telephone in retrieving and accessing wireless data through the Internet.

The present invention has many advantages over the prior art. The entire unit combines a fully functional, sub-notebook personal computer and a mobile telephone into a very small and lightweight unit that is a fraction of the size of a conventional laptop. The computer can also be used as a direct satellite system Internet telephone. This approach uses a PC-based satellite gateway to the Internet and does not require the user to pay for two user-access service fees: one fee for mobile telephone service and another fee for Internet access. Another advantage is that the unit can do mobile video conferencing using Bluetooth technology, either in an office or in a wired environment such as an airport.

The sub-notebook computer of the present invention is an excellent work-at-home device because it handles all frequently used home office functions, such as a computer, telephone, fax machine, and personal digital assistant. The device allows employees to stay connected with other office-bound workers while at home, via e-mail and video conferencing functions. The device also has advanced calendaring functions to make it easy to find people with which one needs to communicate. Because of the screen size of the device, images may be comfortably viewed, thereby contributing to a paperless office.

While the invention has been shown or described in only some of its forms, it should be apparent to those skilled in the art that it is not so limited, but is susceptible to various changes without departing from the scope of the invention.

What is claimed is:

1. A portable computing and communications device, comprising:
    a portable computer having an outer surface, a base with a keyboard, a cover with a monitor pivotably mounted to the base for movement between an open position and a closed position, and a form factor that defines an external appearance of the computer;
    a mobile telephone having a surface, a mounted position wherein the surface of the telephone faces and is mounted on the outer surface of the computer without having to detach a battery pack from the telephone, and a detached position wherein the telephone is removed from the computer, wherein the form factor of the computer is maintained in both the mounted and detached positions regardless of whether the computer is in the open or closed position; and
    wherein the computer and the telephone have wireless communications circuitry for both voice and data and, in the detached position, both the telephone and the computer are simultaneously and independently operable.

2. The device of claim 1, further comprising a rotatable charge-coupled device camera having swivel still and motion capabilities.

3. The device of claim 1 wherein the telephone is retained on the computer with a snap-lock feature, and the telephone has a surface with keying features that are complementary to keying features on an outer surface of the base.

4. The device of claim 1 wherein the monitor is mounted between the base and the cover.

5. The device of claim 1, further comprising a speaker phone feature on at least one of the computer and the telephone for hands-free telephony in both the mounted and detached positions.

6. The device of claim 1 wherein, in the mounted position, the telephone and the computer automatically communicate data therebetween.

7. The device of claim 1 wherein the telephone is mountable and detachable from the computer while the computer is in either the open or closed position.

8. A portable computing and communications device, comprising:
    a sub-notebook computer having a base with a keyboard, a cover with a monitor pivotably mounted to the base for movement between an open position and a closed position, and a form factor that defines an external appearance of the computer;
    a mobile telephone having end portions and a length extending between the end portions, the telephone also having a mounted position on the base of the computer adjacent to the keyboard such that at least a portion of the length of the telephone is exposed when the telephone is secured to the base of the computer, and a detached position wherein the telephone is removed from the computer, wherein the form factor of the computer is maintained in both the mounted and detached positions regardless of whether the computer is in the open or closed position, wherein the telephone is retained on the computer with a snap-lock feature including a protrusion and a dimple that are complementary to a protrusion and a dimple on the base;

a speaker phone feature on at least one of the computer and the telephone for hands-free telephony in both the mounted and detached positions; and wherein the computer and the telephone have wireless communications circuitry for both voice and data.

9. The device of claim 8, further comprising a rotatable charge-coupled device camera having swivel still and motion capabilities.

10. The device of claim 8 wherein, in the mounted position, the telephone and the computer automatically communicate data therebetween.

11. The device of claim 8 wherein, in the detached position, both the telephone and the computer are simultaneously and independently operable.

12. The device of claim 8 wherein the telephone is mountable and detachable from the computer while the computer is in either the open or closed position.

* * * * *